United States Patent

Fujimori

[11] Patent Number: 5,963,266
[45] Date of Patent: Oct. 5, 1999

[54] VIDEO DISPLAY APPARATUS HAVING AN ON-SCREEN DISPLAY AND METHOD FOR CONTROLLING POSITION THEREOF

[75] Inventor: Shin Fujimori, Tokyo, Japan

[73] Assignee: Sony Corporation, Tokyo, Japan

[21] Appl. No.: 08/739,540

[22] Filed: Oct. 30, 1996

[30] Foreign Application Priority Data

Nov. 6, 1995 [JP] Japan .................................. 7-287545

[51] Int. Cl.$^6$ .............................. H04N 5/04; H04N 5/50
[52] U.S. Cl. ...................... 348/511; 348/569; 348/177; 348/555; 345/132; 345/121
[58] Field of Search ................... 348/511, 542, 348/543, 544, 552, 555, 556, 558, 563, 564, 565, 569, 570, 588, 589, 600, 601, 178, 177, 553; 345/127, 132, 121, 125, 131; H04N 5/04, 5/50

[56] References Cited

U.S. PATENT DOCUMENTS

| | | | |
|---|---|---|---|
| 4,979,738 | 12/1990 | Frederiksen | 345/127 |
| 5,136,390 | 8/1992 | Inova et al. | 358/231 |
| 5,500,654 | 3/1996 | Fujimoto | 345/132 |
| 5,555,027 | 9/1996 | Takeuchi | 348/581 |
| 5,781,185 | 7/1998 | Shin | 345/213 |

FOREIGN PATENT DOCUMENTS

| | | | |
|---|---|---|---|
| 0543089 | 5/1993 | European Pat. Off. | G09G 1/16 |
| 2267802 | 12/1993 | United Kingdom | H04N 5/445 |
| 2283380 | 5/1995 | United Kingdom | H03L 7/08 |

*Primary Examiner*—Michael H. Lee
*Attorney, Agent, or Firm*—Jay H. Maioli

[57] ABSTRACT

A display apparatus for displaying a representation of adjustment data for a video display in a multi-frequency video display apparatus includes circuitry for processing video signals having synchronization signals of various frequencies, circuitry for providing input adjustment data, a microcomputer receiving the adjustment data and controlling the video signal processing based on the adjustment data, a display connected with the video signal processing circuitry, on-screen display circuitry for displaying a representation of the adjustment data on the display, and circuitry for controlling the on-screen display so that the representation of the adjustment data is displayed at substantially the same position on the display across different frequency modes of the multi-frequency video display apparatus. Also, a method for displaying a representation of adjustment data for a video display in a multi-frequency video display apparatus, where the adjustment data is displayed at substantially the same position on a display screen includes the steps of detecting the frequency of the horizontal synchronizing signal of the input, detecting the raster position on the display screen, obtaining the position for the representation based on the position of the raster, and calculating the position of the representation, thereby displaying the representation of the adjustment data at substantially the same position on the display for different frequency modes of the multi-frequency video display apparatus.

12 Claims, 3 Drawing Sheets

VIDEO DISPLAY APPARATUS HAVING AN ON-SCREEN DISPLAY AND METHOD FOR CONTROLLING POSITION THEREOF

BACKGROUND OF THE INVENTION

The present invention relates to a video display apparatus and method for use with, for example, a multiscan monitor. Multiscan monitors are designed to operate with input video signals having different horizontal frequencies and are used in color television receivers and computer monitors.

Currently there are computer monitors and television receivers which in addition to displaying an input video signal can display various monitor parameters that can be adjusted by displaying characters, numerals, graphics or a combination thereof. This capability to display the parameters to be adjusted is called "on-screen display" (hereinafter "OSD").

These video display devices having OSD capability are designed to allow the user to adjust parameters related to the video display operation. These parameters include the size and center position of the picture screen (raster) displayed upon under-scanning, the rotational distortion and the pin-cushion distortion of the screen resulting from geomagnetism, convergence, brightness, contrast and other parameters.

Such parameters are digitally adjusted by using operation keys used for controlling the adjustment amount of the elements. When these operation keys are used, graphs representing the current adjustments of the parameters are displayed and changed to reflect the new settings on the OSD portion of the display screen, thereby giving the user a visual feedback of the adjustment status.

FIG. 1 of the accompanying drawings is a front view of a monitor illustrating a manner in which the adjustment information is typically displayed on the display screen. Operation keys 31a, 31b, 32a, 32b used for controlling an increase and decrease of an adjustment amount are provided at fixed locations on the display apparatus. Further shown in FIG. 1, is an OSD Representation area displayed at a predetermined position of a display screen used to display the current adjustment settings using cursors 35 and 36 on bar graphs 33 and 34, respectively. By operating keys 31a, 31b and 32a, 32b the cursors 35 and 36 are respectively moved left or right corresponding to the adjustment being made, thereby giving the user a visual feedback.

The display apparatus of the computer system may receive video signals having various horizontal frequencies. For example, the video signals may have horizontal frequencies ranging from 15.75 kHz, which is similar to that of an ordinary television signal, to 31.5 Khz or 35 kHz used for high-definition display modes, or higher.

Since the horizontal linearity characteristics are changed depending on the horizontal frequency, an apparatus capable of receiving video signals having several horizontal frequencies, for example, a multiscan monitor, moves a raster position along the horizontal direction so that the picture is displayed at a position with an optimum horizontal linearity characteristic. Moreover, in order not to change the center position of a picture in response to the movement of the raster, such apparatus shifts the position of the picture relative to the raster to the center position thereof again.

The representation of the OSD described above is generally formed with reference to the synchronization signal. Therefore, when the raster position is moved as described above, the display position of the OSD representation is moved to the left or right on the picture screen in response to the change in the synchronization signal. In this case, since the respective OSD representations 33, 34 are displayed to be in alignment with the operation keys 31a, 31b and 32a, 32b, the movement of the raster will throw this alignment off to the point where the OSD representations 33, 34 may be moved off the screen, thereby preventing the user from seeing the full OSD representation.

SUMMARY OF THE INVENTION

It is an object of the present invention to provide a multiscan video display apparatus having an on-screen display ("OSD") and a method to prevent the OSD from moving on the display screen as the position of a raster is moved, thereby keeping the OSD information aligned with the corresponding operation keys on the display apparatus.

This and other objects, advantages, and features of the present invention will become apparent to those skilled in the art upon consideration of the following description of the present invention.

According to a first aspect of the present invention, a display apparatus for displaying a representation of adjustment data for a video display in a multi-frequency video display apparatus includes: circuitry for processing video signals having synchronization signals of various frequencies; circuitry for providing input adjustment data; a microcontroller receiving the adjustment data and for controlling the video signal processing based on the adjustment data; a display connected with the video signal processing circuitry; on-screen display circuitry for displaying a representation of the adjustment data on the display; and circuitry for controlling the on-screen display so that the representation of the adjustment data is displayed at substantially the same position on the display across different frequency modes of the multi-frequency video display apparatus.

According to a second aspect of the present invention, a method for displaying a representation of adjustment data for a video display in a multi-frequency video display apparatus, where the adjustment data is displayed at substantially the same position on a display screen, includes the steps of: detecting the horizontal frequency of the input synchronizing signal; detecting the raster position on the display screen; obtaining the position for the representation based on the position of the raster; and calculating the position of the representation, thereby displaying the representation of the adjustment data at substantially the same position on the display across different frequency modes of the multi-frequency video display apparatus.

DETAILED DESCRIPTION OF THE INVENTION

Figure 1:
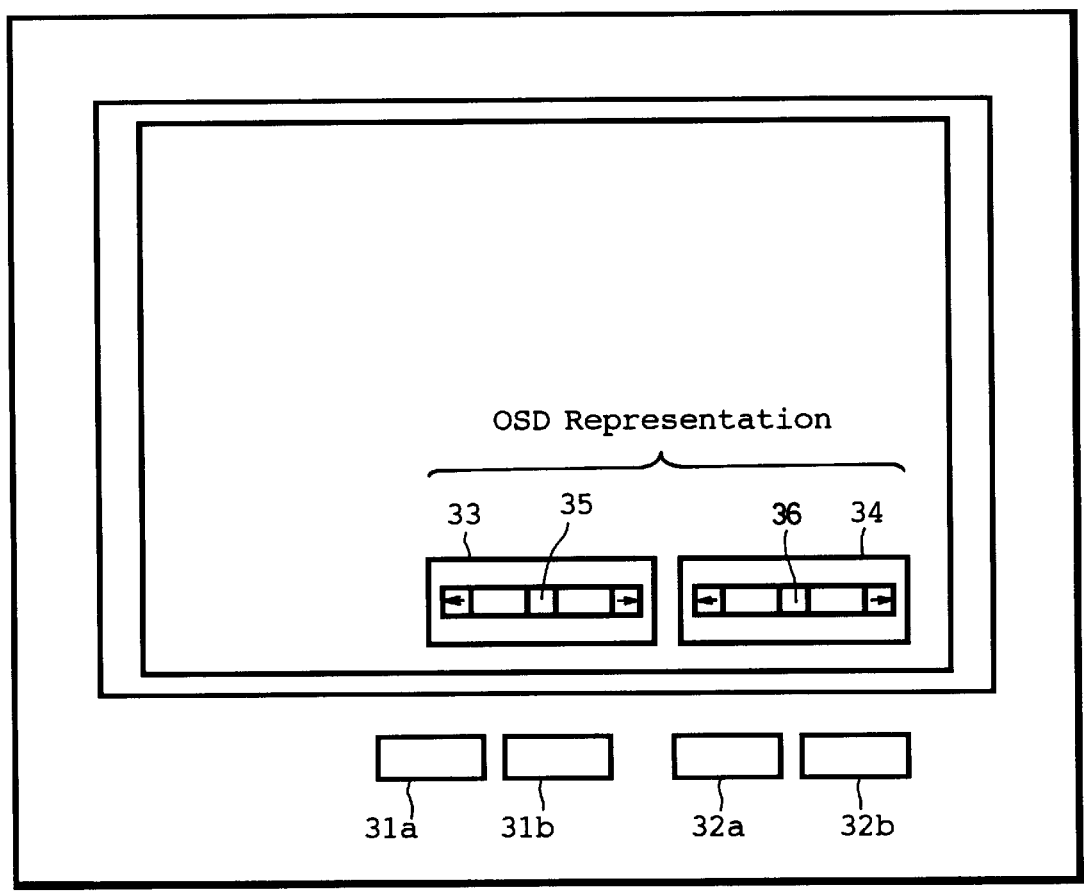
FIG. 1 is a front view of a video monitor used to explain the manner in which adjustment data is displayed on the on-screen display ("OSD")

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Figure 2:
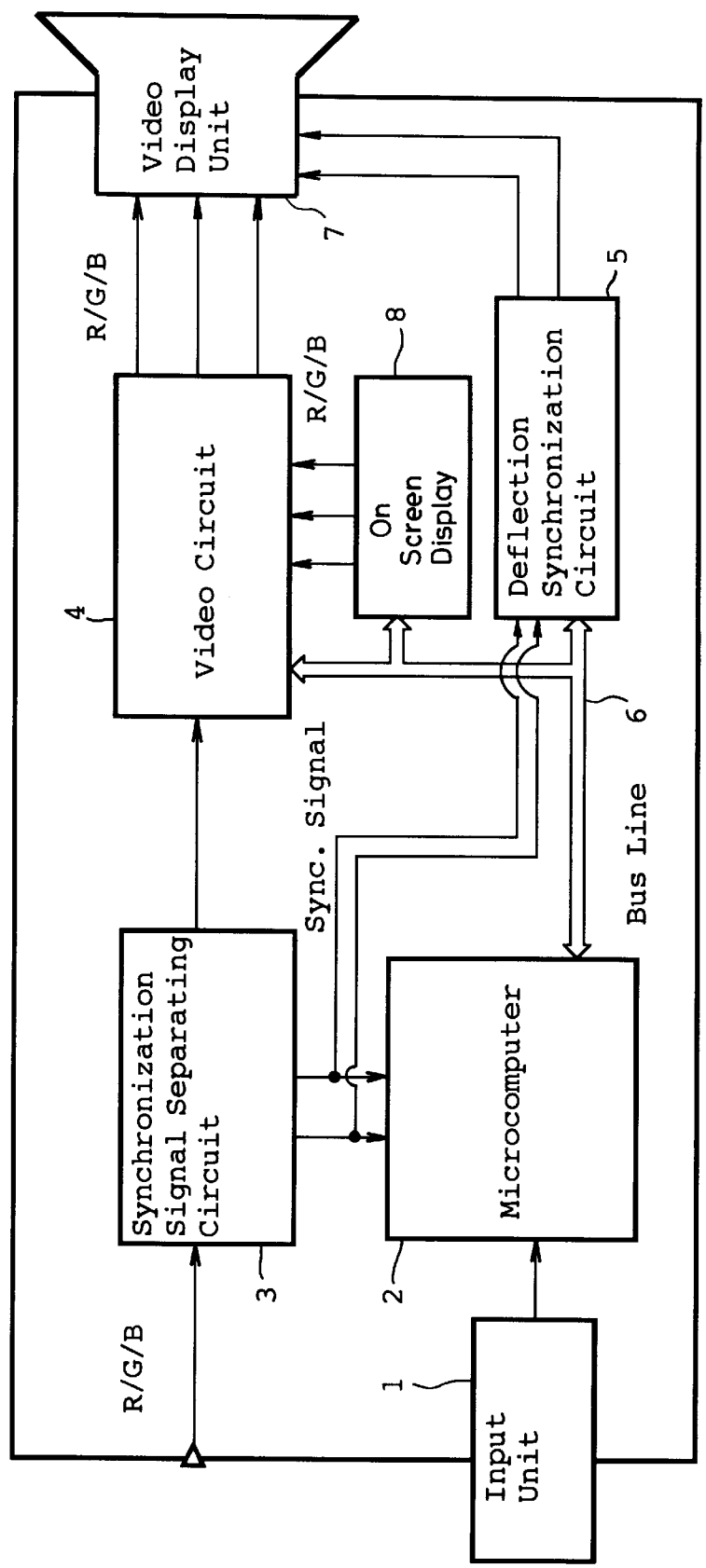
FIG. 2 is a schematic in block diagram form of a video monitor according to an embodiment of the present invention.

Turning now to FIG. 2, the present invention is used in a multi-scan monitor, which is a monitor capable of processing and displaying an input video signal having one of several different horizontal frequencies. An input unit 1 includes a plurality of operation keys or a remote controller used for inputting data to the monitor. The input data is supplied from the input unit 1 to a microcomputer 2 for controlling the whole apparatus.

A synchronization signal separating circuit 3 separates synchronization signals from the supplied R, G, B video signals and supplies the R, G, B video signals to a video circuit 4. The synchronization signal separating circuit 3 supplies the separated synchronization signals to a deflection synchronization circuit 5 and also to the microcomputer 2.

The microcomputer 2 discriminates the horizontal frequency of the supplied synchronization signal and generates, in response to the discriminated horizontal frequency, control data used for moving a raster position and control data used for re-centering the picture position. The microcomputer 2 supplies this control data through the bus lines 6 to the video circuit 4 and the deflection synchronization circuit 5.

Thus, the picture obtained from the R, G, B video signals supplied by the video circuit 4 is displayed on a video display unit 7 using as reference the deflection signals supplied from the deflection synchronization circuit 5. In this case, the deflection synchronization circuit 5 operates to move the raster position so that linearity characteristics are optimized in response to the horizontal frequency of the video signal, thereby re-centering the picture position.

The display apparatus further includes an on-screen display (OSD) circuit 8 supplied by the microcomputer 2 through the bus line 6 with the adjustment data by operation of the above mentioned keys. The OSD circuit 8 generates R, G, B signals for the OSD representation of the parameter to be adjusted. The OSD circuit 8 supplies the generated OSD representation signal to the video circuit 4.

The video circuit 4 superimposes the OSD representation signal on the video signal and supplies the processed video signal to the video display unit 7.

When the parameter adjustment is increased or decreased by using the operation keys of the input unit 1, the microcomputer 2 controls several of the circuits of the monitor as shown, including the video circuit 4. These circuits then carry out various digital processing operations, for example, the OSD circuit 8 generates a signal representing the parameter under adjustment which signal is then displayed on the video display unit 7, thereby giving the user a visual feedback of the adjustment status.

Moreover, the control data used for shifting the position of the OSD in response to the horizontal frequency is supplied to a register (not shown) provided in the OSD circuit 8 by the microcomputer 2 through the bus line 6. The OSD circuit 8 corrects the output signals in response to the control data so that the OSD is located at a constant position. Specifically, based on the control data, the OSD circuit 8 controls the timing at which the OSD signal is supplied to the video circuit 4, thereby controlling the display position of the OSD on the display screen of the video display unit 7. The manner in which such timing is controlled will be described in relation to FIG. 3.

Figure 3:
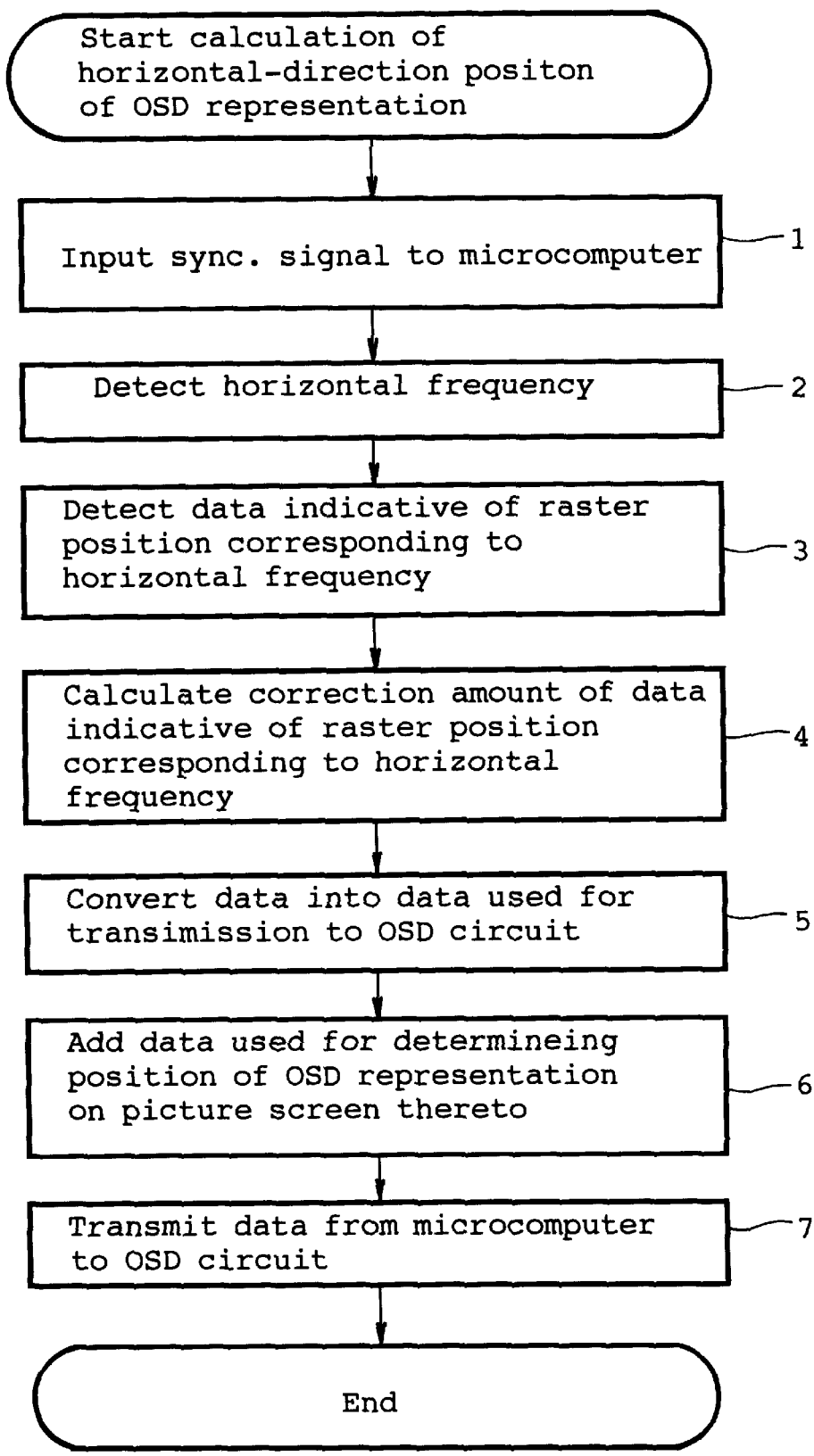
FIG. 3 is a flowchart of the OSD position control method, according to an embodiment of the present invention.

Turning now to FIG. 3, the method for controlling the position of the OSD will be described. When the process for calculating the horizontal-direction position of the OSD representation is started in step 1, the synchronization signal is input to the microcomputer 2. Next, the processing proceeds to step 2, where the microcomputer 2 detects the frequency of the horizontal synchronizing signal in the input R, G, B signal. Then, the processing proceeds to step 3, where the microcomputer 2 detects data denoted as Hcent, which is indicative of the raster position corresponding to the detected horizontal frequency. The data indicative of the raster position is, for example, the data Hcent indicative of a center position of the raster. This data corresponding to each of the horizontal frequencies is stored in a register (not shown) of the microcomputer 2.

In step 4, the microcomputer 2 calculates a correction amount HCentMax−HCent of the data indicative of the raster position corresponding to the detected frequency of the horizontal synchronization signal. Then in step 5, the microcomputer 2 converts the calculated data into data for transmission to the OSD circuit 8, this conversion is carried out by calculating HPosiSlope×(HCentMax−Hcent). Next, in step 6, the microcomputer 2 adds data HPosi used for determining the position of the OSD representation on the picture screen to the data obtained in step 5. Finally in step 7, the microcomputer 2 transmits the data to the register provided in the OSD circuit 8 and the process is ended, thereby displaying the adjustment data on the OSD portion of the display screen of the video display unit 7 at a constant position in response to the detected horizontal frequency.

The following Equation (1) is used to calculate the horizontal-direction position of the OSD representation (OSDHPOsi).

$$OSDHPosi = HPosiSlope \cdot (HCentMax - HCent) + HPosi \qquad (1)$$

In Equation (1), HCent depicts the data indicating the raster position, and HCentMax depicts a maximum value of the data indicating the raster position. Therefore, it is possible to detect the correction amount of the position of the OSD representation by calculating the difference between these two values.

If the difference is multiplied with a coefficient HPosiSlope, then the data indicating the difference is converted into a data unit used for transmitting the data to the OSD circuit 8, this data unit being the data indicating the correction amount to be actually transmitted to the OSD circuit 8. This data indicating the correction amount is added with data HPosi (which is set to be an optimum value when HCent=HCentMax) indicating the position of the OSD representation obtained without the correction, whereby it is possible to generate the data to allow the horizontal-direction position of the OSD representation to be displayed at a constant position regardless of the horizontal frequency.

According to the present invention, since the position of the OSD representation is corrected in response to the horizontal frequency, it is possible to display the OSD representation at a substantially constant position on the picture screen.

Thus, it is apparent that in accordance with the present invention an apparatus and method that fully satisfy the objectives, aims, and advantages is set forth above. While the invention has been described in conjunction with specific embodiments, it is evident that many alternatives, modifications, permutations, and variations will become apparent to those skilled in the art in light of the foregoing description. Accordingly, it is intended that the present invention embrace all such alternatives, modifications and variations as fall within the scope of the appended claims.

What is claimed is:

1. An apparatus for displaying a representation of adjustment data on a video display of a multi-frequency video display apparatus, comprising:
   video signal processing means for processing one of a plurality of video signals having respective synchronization signals of different frequencies;
   input means for receiving adjustment data for display on said video display;
   microcontroller means for receiving said adjustment data from said input means and for controlling said video signal processing means based on said adjustment data;
   display means for receiving and displaying said video signals on said video display;
   means for connecting said display means to said video signal processing means;
   on-screen display means for displaying said representation of said adjustment data on said video display; and
   controlling means for controlling said on-screen display means and a deflection synchronization circuit so that said representation of said adjustment data is displayed at a substantially constant position on said video display of said multi-frequency video display apparatus.

2. The apparatus according to claim 1, in which said substantially constant position is a horizontal position on said video display.

3. The apparatus according to claim 2, in which said controlling means outputs control data fed to said deflection synchronization circuit for controlling said horizontal position on said on-screen display means.

4. The apparatus according to claim 3, in which said control data includes compensation data calculated from a position of a raster on said video display.

5. The apparatus according to claim 1, in which said representation includes a cursor.

6. An apparatus for displaying a representation of adjustment data on a video display of a multi-frequency video display apparatus, comprising:
   a microcomputer;
   an input unit for receiving adjustment data for said video display apparatus, said input unit connected to said microcomputer;
   an input terminal for receiving an input video signal having one of a plurality of different horizonal frequencies for display on said video display;
   a deflection synchronization circuit;
   a synchronization signal separating circuit connected to said input terminal for separating a synchronization signal from said input video signal, said synchronization signal fed to said microcomputer and to said deflection synchronization circuit;
   an on-screen display circuit for generating an on-screen display video signal representing said adjustment data;
   a video circuit for generating an added video signal by adding said input video signal to said on-screen display video signal and feeding said added video signal to said video display, thereby displaying said added video signal, wherein
   said deflection synchronization circuit is connected to said video display for synchronizing said added video signal so that said representation of said adjustment data is displayed at a substantially constant position on said video display; and
   a bus for connecting said microcomputer to said video circuit, said on-screen display, and said deflection synchronization circuit, wherein
   said microcomputer controls a position of said representation of said adjustment data by calculating and outputting compensation data to said bus based on at least said adjustment data and said synchronization signal.

7. The apparatus of claim 6, in which said input unit includes a plurality of keys.

8. The apparatus of claim 6, in which said input unit includes a remote control.

9. A method for displaying a representation of adjustment data on a video display screen of a multi-frequency video display apparatus having as an input one of a plurality of video signals having respective synchronization signals of various frequencies, comprising the steps of:
   detecting a synchronization signal frequency of the input signal;
   detecting a position of a raster on said screen;
   obtaining position data for said representation on said video display screen from the detected position of said raster; and
   displaying said representation on said video display screen based on said position data.

10. The method according to claim 9, in which said step of obtaining position data includes calculating compensation data for said position data based on the detected position of said raster.

11. The method according to claim 10, further comprising the step of controlling the position of said representation on said video display screen based on said compensation data, thereby displaying said representation of adjustment data at a substantially constant position on said video display screen.

12. A method for displaying a representation of adjustment data on a video display screen of a multi-frequency video display apparatus having as an input one of a plurality of video signals having respective synchronization signals of various frequencies, comprising the steps of:
   detecting a horizontal synchronization signal frequency of the input signal;
   detecting a position of a raster on said screen corresponding to the horizontal synchronization signal;
   obtaining position data for said representation on said video display screen from the detected position of said raster;
   calculating compensation data for said position data based on the detected position of said raster; and
   controlling the position of said representation on said video display screen based on said compensation data, thereby displaying said representation of adjustment data at a substantially constant position on said video display screen.

* * * * *